US012352088B2

(12) United States Patent
Renard et al.

(10) Patent No.: US 12,352,088 B2
(45) Date of Patent: Jul. 8, 2025

(54) TELESCOPIC ASSEMBLY WITH LOCKING DEVICE IN RETRACTED CONFIGURATION

(71) Applicant: LISI AEROSPACE, Paris (FR)

(72) Inventors: Laurent Renard, Saint-Ouen-l'Aumône (FR); Bastien Bellavia, Mereau (FR)

(73) Assignee: LISI AEROSPACE, Paris (FR)

( * ) Notice: Subject to any disclaimer, the term of this patent is extended or adjusted under 35 U.S.C. 154(b) by 69 days.

(21) Appl. No.: 18/370,682

(22) Filed: Sep. 20, 2023

(65) Prior Publication Data

US 2024/0125159 A1   Apr. 18, 2024

(30) Foreign Application Priority Data

Oct. 18, 2022   (FR) ...................................... 2210754

(51) Int. Cl.
| | |
|---|---|
| *E05F 1/10* | (2006.01) |
| *B64C 7/02* | (2006.01) |
| *E05C 17/30* | (2006.01) |

(52) U.S. Cl.
CPC .............. *E05F 1/1025* (2013.01); *B64C 7/02* (2013.01); *E05C 17/30* (2013.01); *E05Y 2201/22* (2013.01); *E05Y 2900/502* (2013.01)

(58) Field of Classification Search
CPC .......... E05F 1/1025; B64C 7/02; E05C 17/30; E05Y 2201/22; E05Y 2900/502
See application file for complete search history.

(56) References Cited

U.S. PATENT DOCUMENTS

| | | | | |
|---|---|---|---|---|
| 4,421,349 A | * | 12/1983 | Greiert, Jr. ............. | B64D 29/06 |
| | | | | 292/DIG. 31 |
| 4,531,769 A | * | 7/1985 | Glancy ................... | E05C 19/14 |
| | | | | 292/DIG. 31 |
| 4,538,843 A | * | 9/1985 | Harris ................... | E05C 19/145 |
| | | | | 292/DIG. 31 |

(Continued)

FOREIGN PATENT DOCUMENTS

| | | |
|---|---|---|
| CN | 111692174 | 9/2020 |
| DE | 102010044669 | 12/2011 |

(Continued)

OTHER PUBLICATIONS

Kovács, Endre, Preliminary Search Report, Jun. 16, 2023, 2 pages, National Institute of Industrial Property, Courbevoie, France.

*Primary Examiner* — Anita M King
(74) *Attorney, Agent, or Firm* — Henricks Slavin LLP

(57) ABSTRACT

Telescopic assembly with locking device in retracted configuration A telescopic assembly (10) includes: a first (12) and a second (14) body; the second body comprising a rod capable of sliding into the first body between extended and retracted configurations; and a device (18) for locking in the retracted configuration. The locking device includes a ferrule (60) positioned on the rod, the ferrule comprising an internal stop (80) and the first tubular body comprising a counter-stop (34), capable of cooperating to lock the first tubular body and the ferrule. The ferrule is locked in translation relative to the second body (14) and rotatable around said second body, between an unlocked position, allowing the sliding of the second body into the first body (12), and a locked position retaining the second body in the retracted configuration.

9 Claims, 7 Drawing Sheets

(56) References Cited

U.S. PATENT DOCUMENTS

| | | | | | |
|---|---|---|---|---|---|
| 5,984,382 | A | * | 11/1999 | Bourne | ................ E05C 19/145 |
| | | | | | 292/DIG. 31 |
| 8,925,979 | B2 | * | 1/2015 | Hernandez | .............. E05C 19/14 |
| | | | | | 292/DIG. 31 |
| 2020/0291688 | A1 | * | 9/2020 | Astier | .................... E05B 63/06 |

FOREIGN PATENT DOCUMENTS

| | | |
|---|---|---|
| EP | 2914793 | 5/2014 |
| EP | 3826917 | 6/2021 |

* cited by examiner

TELESCOPIC ASSEMBLY WITH LOCKING DEVICE IN RETRACTED CONFIGURATION

BACKGROUND

The present invention relates to a telescopic assembly comprising: a first tubular body, extending along a main axis; and a second tubular body comprising an enlarged portion and a rod, said rod being capable of sliding into a first axial end of the first tubular body for movement between an extended configuration and a retracted configuration.

Such a telescopic assembly, described specifically in document EP2914793, can be used, for example, to secure a cowl in an open position relative to a structure.

Aircraft engine nacelles are fitted with cowls that need to be kept closed during flight. This exposes the cowls to significant pressure differentials, as well as wide temperature variations. It is therefore essential that they include a secure locking system.

SUMMARY

The purpose of the present invention is to provide a device that ensures the secure closure of aircraft engine nacelle cowls, particularly given the context of significant pressure and temperature variations.

The invention therefore relates to a telescopic assembly of the aforementioned type which additionally comprises a device for locking the retracted configuration, said locking device comprising a ferrule extending along the main axis, a first axial end of said ferrule being positioned around a first end of the rod of the second tubular body, close to the enlarged portion; a second axial end of the ferrule comprising an internal stop; the first axial end of the first tubular body comprising a counter-stop, capable of cooperating with said internal stop to lock the first tubular body and the ferrule in translation; the ferrule being locked in axial translation relative to the second tubular body and rotatable around said second body, between an unlocked position and a locked position; the telescopic assembly being such that: in the unlocked position, the internal stop is angularly offset relative to the counter-stop, so as to allow the sliding of the second tubular body into the first tubular body between the extended configuration and the retracted configuration; and in the locked position, the stop is angularly aligned with the counter-stop, so as to secure the second tubular body in the first tubular body in the retracted configuration.

Other beneficial aspects of the invention are that the telescopic assembly comprises one or more of the following features, either individually or in any technically possible combination:
- the telescopic assembly further comprises a locking device capable of allowing or preventing rotation of the ferrule, wherein the locking device comprises: a socket positioned around the first end of the rod; and a compression spring, the compression spring being positioned axially between the enlarged portion of the second tubular body and the socket;
- the telescopic assembly further comprises a pin integral with the first axial end of the ferrule and projecting internally relative to said ferrule, and wherein the locking device comprises an L-shaped groove, said L-shaped groove comprising a longitudinal arm and a transverse arm, respectively parallel and perpendicular to the main axis, such that: in the unlocked position, the first end of the first body is at a distance from the socket, the spring is in a state of minimum compression, and the pin is positioned in the longitudinal arm of the L-shaped groove of the locking device; and in the locked position, the first end of the first body is in contact with the socket, the spring is in a state of maximum compression, and the pin is positioned in the transverse arm of the L-shaped groove;
- the second tubular body comprises a skirt extending around the first end of the rod, said skirt comprising a transverse slot into which the pin is able to slide;
- the locking device further comprising a device for retaining the ferrule in a locked or unlocked position;
- the retaining device comprises: a ball capable of sliding radially into an internal housing of the ferrule; and a cup capable of receiving the ball projecting internally relative to the ferrule;
- the telescopic assembly further comprises at least one intermediate tube between the rod and the first tubular body, the at least one intermediate tube capable of sliding around the rod and in the first axial end of the first tubular body;
- the telescopic assembly further comprises an actuator capable of pivoting the ferrule around the main axis, between the locked and unlocked positions.

The invention further relates to a device comprising: a first cowl; a second cowl; and a telescopic assembly as described above, the first tubular body and the second tubular body being assembled respectively to the first cowl and to the second cowl, the extended configuration of the telescopic assembly allowing the first and second cowls to be fixed in an open position, the retracted configuration of the telescopic assembly allowing the first and second cowls to be fixed and retained in a closed position.

BRIEF DESCRIPTION OF THE DRAWINGS

The invention will be better understood on reading the following description, given solely by way of non-limiting example and made with reference to the drawings on which.

DETAILED DESCRIPTION

Figure 1:
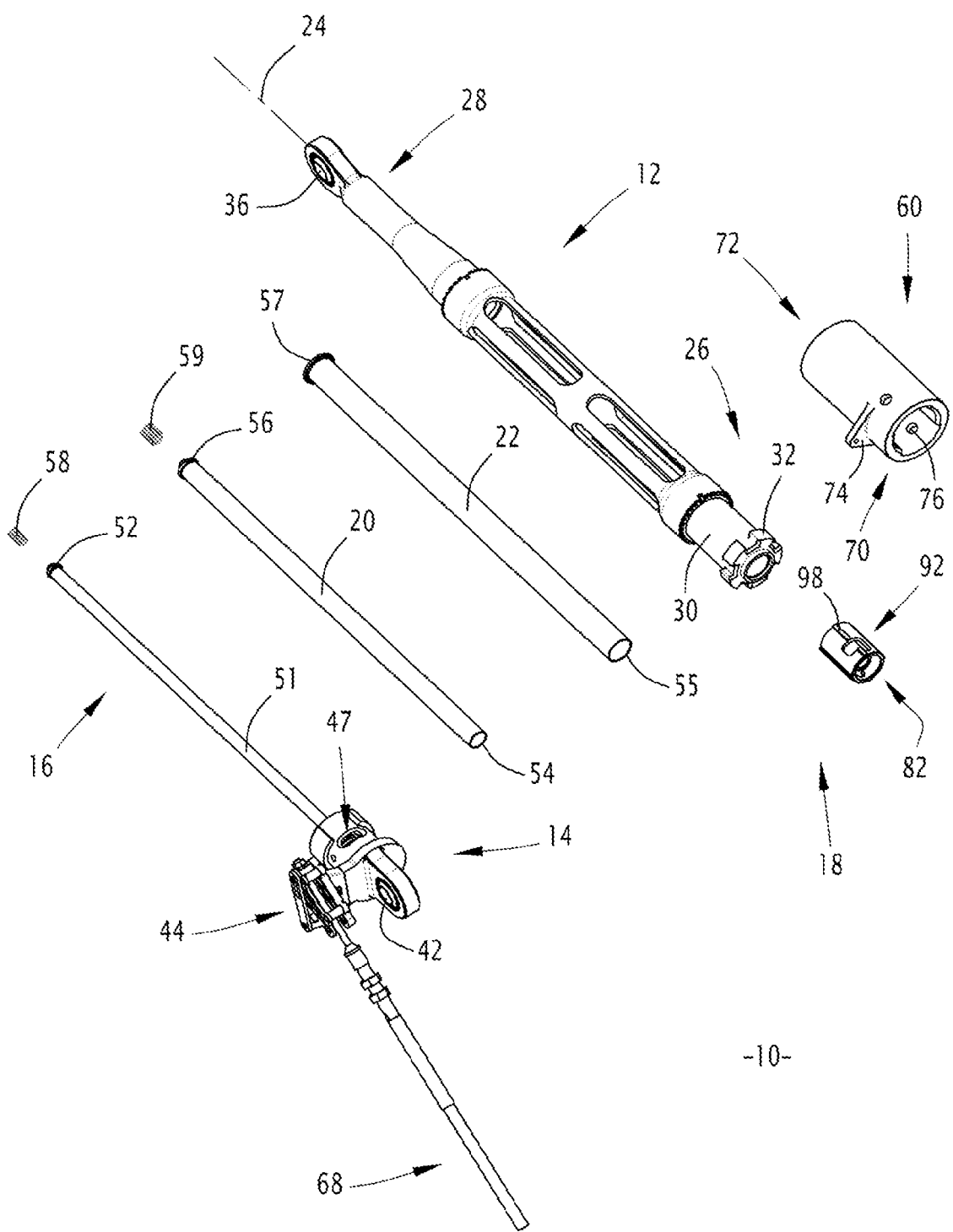
FIG. 1 is a partial exploded perspective view of a telescopic assembly according to one embodiment of the invention.

FIG. 1 shows a partial exploded view of a telescopic assembly 10 according to one embodiment of the invention.

Assembly 10 comprises: a first tubular body 12; a second tubular body 14; and a locking device 18. Preferably, assembly 10 also includes at least one intermediate tube 20, 22. In the embodiment shown, the assembly 10 comprises a first and a second intermediate tube 20 and 22.

The tubular body 12 extends along a main axis 24, between a first open end 26 and a second closed end 28.

The first end 26 has a substantially circular-cylindrical neck 30 and teeth 32 positioned around the neck. Each tooth 32 protrudes radially outwards from the neck 30. Two adjacent teeth are separated by a non-zero angular space. Each tooth 32 has a substantially flat rear face 34, perpendicular to the main axis 24 and facing the second end 28 of the first tubular body. The first end also features a substantially flat annular end face 35, perpendicular to the main axis 24.

The second end 28 comprises a first assembly means 36, for example, a first spherical bearing, able to be assembled to a fastening point A1 of a first cowl A of a nacelle.

FIGS. 2 to 6 show assembly 10 in an assembled state, in which the second tubular body 14 and the first and second intermediate tubes 20 and 22 are arranged along the main axis 24. In the following description, assembly 10 is assumed to be in the assembled state.

Figure 7:
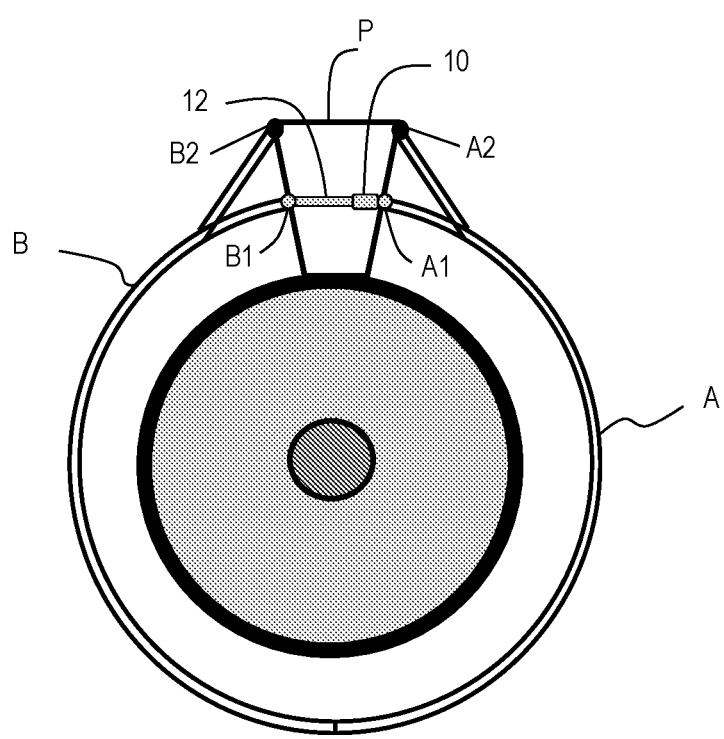
FIG. 7 is a cross-sectional schematic view of the assembly assembled to engine nacelle cowls in a retracted configuration.

FIG. 7 shows an engine nacelle in a closed position, with first cowl A hinged to a pylon P at hinge A2, a second cowl B hinged to the pylon P at hinge B2, the assembly 10 being in a retracted configuration linking the first and second cowls through two fastening points A1 and E1.

The second tubular body 14 comprises an enlarged portion 38, a skirt 40 and a rod 16, aligned along the main axis 24.

The enlarged portion 38 comprises: a second assembly means 42, for example a second spherical bearing able to be assembled to fastening point B1 of a second cowl B of a nacelle; and an actuator support 44. Support 44 is configured for assembly to actuator 68, as will be described later.

The enlarged portion 38 has a substantially flat rear face 46. The rear face 46 is perpendicular to the main axis 24 and faces towards the second end 28 of the first tubular body.

The skirt 40 is substantially rotationally cylindrical and extends axially from the rear face 46 of the enlarged portion 38.

The skirt 40 comprises: at least one transverse slot 47; at least one inner rib 48; and at least a first 49 and a second 50 outer cup.

The at least one transverse slot 47 extends perpendicular to the main axis 24, between two closed ends. In the embodiment shown, the skirt 40 has two transverse slots 47, symmetrical to each other relative to the main axis 24.

The at least one groove 48 extends on an inner surface of the skirt 40, parallel to the main axis 24. In the embodiment shown, the skirt 40 comprises a plurality of grooves 48.

Each of the first outer cups 49 and the second outer cups 50 form a recess on the outer surface of the skirt 40. In the embodiment shown, the skirt 40 comprises two first outer cups 49, symmetrical to each other relative to the main axis 24; and two second outer cups 50, symmetrical to each relative to the main axis 24. Each of the outer cups 49, 50 have the shape of a truncated cone or part of a sphere.

The rod 16 extends along the main axis 24 between a first 51 and a second 52 end. The first end 51 is integral with the rear face 46 of the enlarged portion 38 and positioned in the skirt 40.

Figure 2:
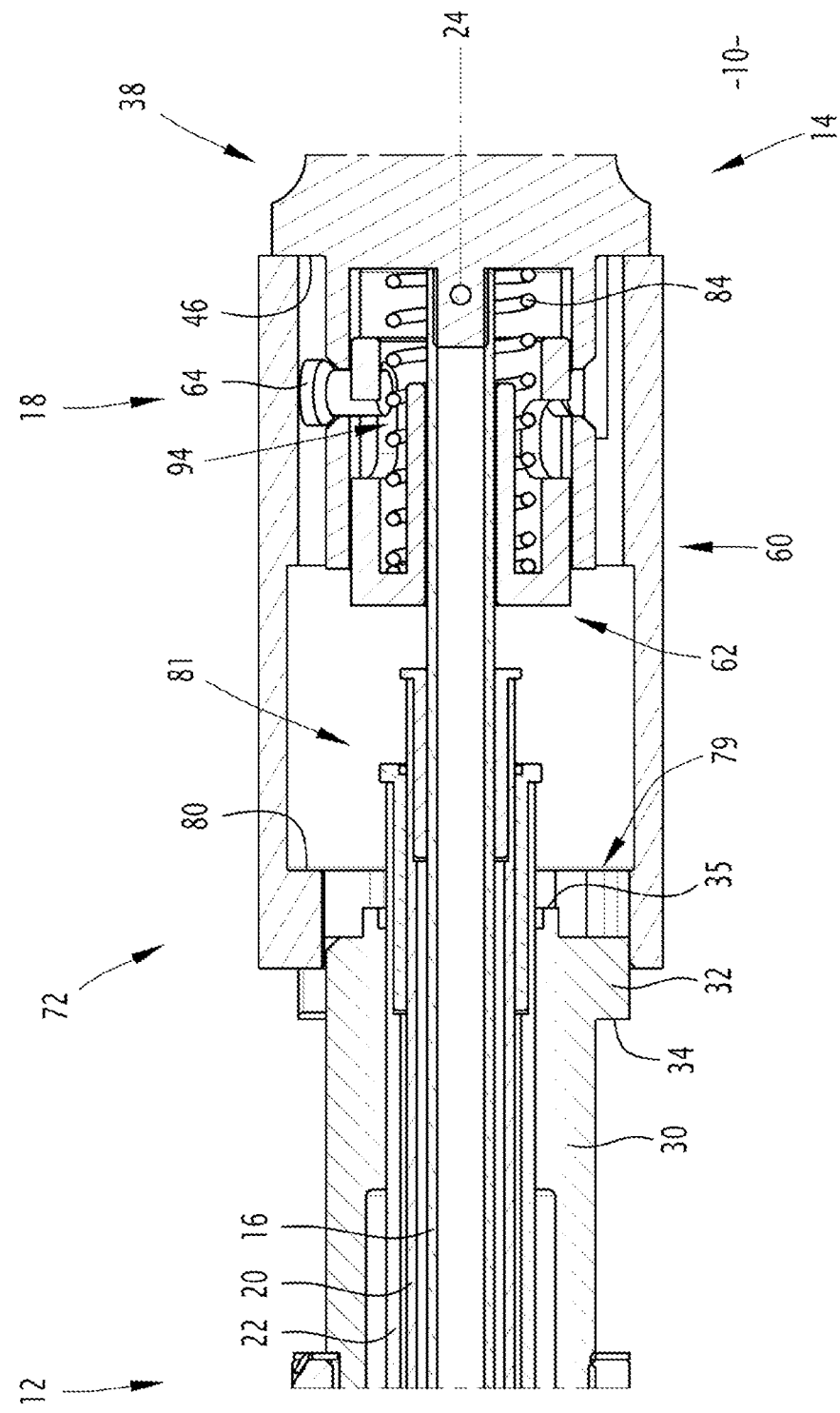
FIG. 2 is a partial view, in longitudinal section, of the assembly shown in FIG. 1 in a first configuration.

The rod 16 of the second tubular body 14 is capable of sliding telescopically into the first tubular body 12, so as to vary the overall length of the assembly 10 along the main axis 24. In a retracted configuration of assembly 10, as shown in FIGS. 3 to 6, said overall length is minimal. In an extended configuration of assembly 10, not shown, said overall length is maximum. FIG. 2 shows the assembly 10 in an intermediate configuration, in which its overall length lies between the minimum and maximum lengths.

In an embodiment not shown, the second end 52 of the rod 16 is positioned in the first tubular body 12 in all configurations, including the extended configuration.

In the embodiment shown, the intermediate tubes 20, 22 form a telescopic system with the tubular body 12 and the rod 16, to enable the assembly 10 to reach a substantial overall length in the extended configuration.

Each of the intermediate tubes 20, 22 extends between an open first end 54, 55 and a closed second end 56, 57. Each of the intermediate tubes 20, 22 is fitted with a compression spring 58, 59 at its second end 56, 57.

Each of the intermediate tubes 20, 22 are capable of sliding telescopically around the rod 16 in the first tubular body. In the extended configuration, the second end 52 of the rod is blocked at the first end 54 of the first intermediate tube 20; the second end 56 of said first intermediate tube is blocked at the first end 55 of the second intermediate tube 22; and the second end 57 of said first intermediate tube is blocked at the first end 26 of the tubular body 12.

In the retracted configuration of the assembly 10, the second end 52 of the rod and the second end 56 of the first intermediate tube axially compress a first spring 58; and the second end 56 of said first tube and the second end 57 of the second intermediate tube 22 axially compress a second spring 59. The retracted configuration will be described in greater detail below.

The locking device 18 is designed to retain the assembly 10 in the retracted configuration.

The locking device 18 comprises: a ferrule 60; a securing device 62; at least one pin 64; and a retaining device 66.

The ferrule 60 has a tubular shape, extending along the main axis 24 between a first open end 70 (FIG. 5) and a second open end 72. The first end 70 of the ferrule is positioned around the skirt 40 of the second tubular body and comes into axial contact with the rear face 46 of the enlarged portion 38.

The ferrule 60 has an external lug 74 for connection to the actuator 68, as described below.

The first end 70 of the ferrule has at least one through hole 76. In the embodiment shown, said first end 70 has two through holes 76, symmetrical to each other relative to the main axis 24.

Figure 4:
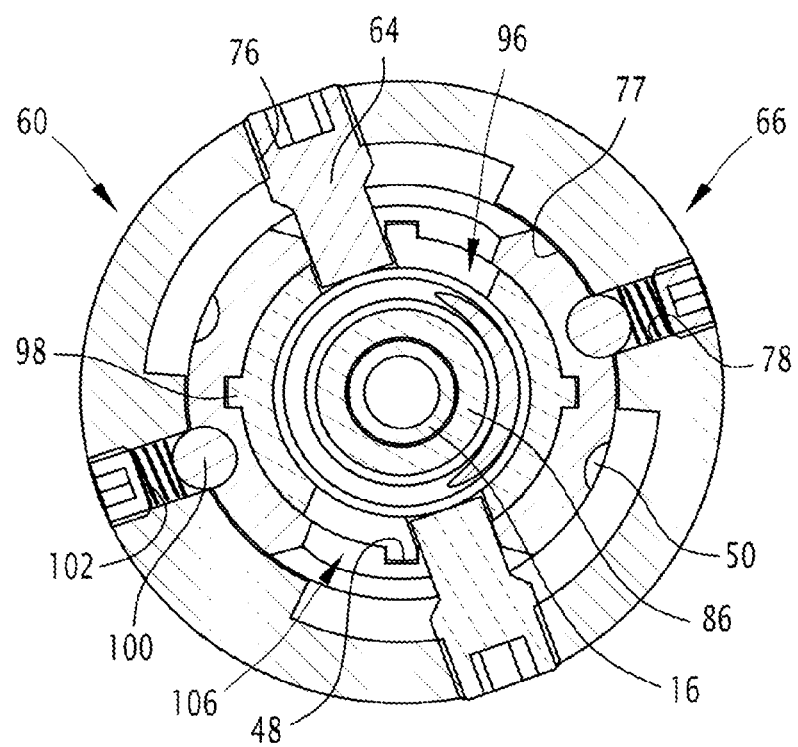
FIG. 4 is a cross-sectional view of the assembly in the second configuration of FIG. 3.

The first end 70 of the ferrule also comprises: at least one internal contact surface 77; and at least one internal housing 78 (FIG. 4). Said internal contact surface 77, in the shape of a portion of a cylindrical revolution, is in contact with an external surface of the skirt 40.

The internal housing 78 is recessed relative to the internal contact surface 77. The internal housing 78 extends radially relative to the main axis 24.

In the embodiment shown, said first end 70 has two internal contact surfaces 77 and two internal housings 78, symmetrical to the main axis 24.

The second end 72 of the ferrule has a recess 79, substantially complementary in shape to the teeth 32 on the first end 26 of the tubular body 12. Adjacent to the recess 79, an inner surface of the ferrule forms an internal stop 80, perpendicular to the main axis 24.

Between the internal stop 80 and the first end 70, the ferrule has an internal cavity 81 onto which the recess 79 opens.

As will be described below, the ferrule 60 is locked in axial translation relative to the second tubular body 14 and can rotate around said second tubular body. The securing device 62 prevents the rotation of the ferrule 60 when the telescopic system is not fully retracted.

The securing device 62 comprises a socket 82 and a third compression spring 84.

The socket 82 has an inner wall 86, an outer wall 88 and a bottom 90. Both the inner wall 86 and the outer wall 88 are tubular and positioned along the main axis 24. The inner wall 86 is fitted onto the first end 51 of the rod 16 and is capable of sliding axially along said rod.

The outer wall 88 is radially spaced from the inner wall 86. The outer wall 88 comprises at least one L-shaped groove 92. Said groove 92 comprises a longitudinal arm 94 and a transverse arm 96, respectively parallel and perpendicular to the main axis 24. Both of said arms 94, 96 extend between a closed end and a junction with the other of said arms.

In the embodiment shown, the outer wall 88 has two grooves 92, symmetrical to each other relative to the main axis 24.

The outer wall 88 also has at least one rib 98 parallel to the main axis 24. The at least one rib 98 has a complementary shape to the at least one groove 48 of the skirt 40. The at least one rib 98 is able to slide axially in the at least one groove 48, so as to prevent the socket 82 from rotating relative to the skirt 40 of the second tubular body.

In the embodiment shown, the outer wall 88 has a plurality of ribs 98, each rib being associated with a groove 48 on the skirt.

The bottom 90 forms a flat ring, perpendicular to the main axis 24 and connecting the inner 86 and outer 88 walls, opposite the enlarged portion 38 of the second tubular body.

The third compression spring 84 is positioned between the inner wall 86 and the outer wall 88 of the socket. The third spring 84 extends axially between the enlarged portion 38 of the second tubular body and the bottom 90 of the socket.

The at least one pin 64 is housed in the at least one through hole 76 of the ferrule 60, forming an internal projection relative to said ferrule. In the embodiment shown, the locking device 18 comprises two pins 64, each of which is positioned in one of the through holes 76 in the ferrule 60.

Each pin 64 is positioned in one of the transverse slots 47 of the skirt 40, and is capable of sliding in said transverse slot. This ensures axial locking of the ferrule 60 relative to the second tubular body 14.

Likewise, one end of each pin 64 is located in one of the grooves 92 of the socket 82, and is capable of sliding in the longitudinal arm 94 and in the transverse arm 96 of said groove.

The retaining device 66 is designed to retain the ferrule 60 in either the locked or unlocked position.

Preferably, the retaining device 66 comprises at least one ball 100 and at least one fourth compression spring 102.

In the embodiment shown, the retaining device 66 comprises two identical assemblies, symmetrical to each other relative to the main axis 24, each of said assemblies being formed by a ball 100 and a fourth compression spring 102.

Each ball 100 is configured to slide into one of the internal housings 78 of the ferrule. Each ball 100 is associated with the corresponding fourth spring 102, positioned in the corresponding internal housing 78 and configured to push said ball out of said internal housing, in the direction of the main axis 24.

The actuator 68 is mounted on the support 44 of the enlarged portion 38 and is connected to the lug 74 of the ferrule 60. The actuator 68 is configured to pivot the ferrule 60 relative to the rod 16 of the second tubular body 14 around the main axis 24. In particular, the actuator 68 is configured to pivot the ferrule 60 between an unlocked position, shown in FIGS. 3 and 4, and a locked position, shown in FIGS. 5 and 6.

The intermediate configuration of the assembly 10, shown in FIG. 2, will now be described.

In the intermediate configuration, the ferrule 60 is in an angular position relative to the second tubular body 14, corresponding to the unlocked position. Each pin 64 is positioned at the closed end of the longitudinal arm 94 of the corresponding groove 92; and at a first end 104 of the corresponding transverse slot 47.

The third spring 84 is in a state of minimum compression.

The end face 35 of the first tubular body, and the first ends 54, 55 of the first and second intermediate tubes 20 and 22 are axially spaced from the bottom 90 of the socket 82: the telescopic system is not fully retracted.

The teeth 32 of the tubular body 12 are partially inserted into the recess 79 of the ferrule. In this configuration, the teeth 32 and the first end 26 of said tubular body are capable of sliding axially in the ferrule, in the direction of the enlarged portion 38.

In addition, each ball 100 of the retaining device 66 is positioned in the corresponding first cup 49.

Figure 3:
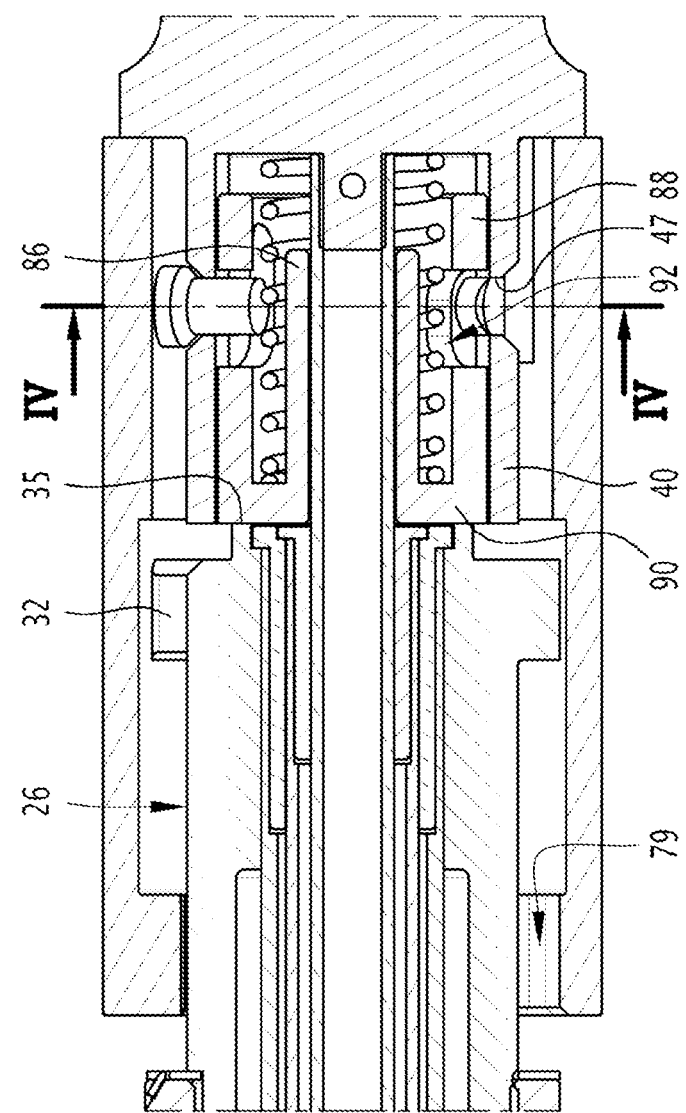
FIG. 3 is a partial view, in longitudinal section, of the assembly shown in FIGS. 1 and 2 in a second configuration.

The configuration shown in FIGS. 3 and 4 will now be described. In FIGS. 3 and 4, the ferrule 60 is in the unlocked position relative to the second tubular body 14 and the assembly 10 is in the retracted configuration.

More specifically, the first end 26 of the first tubular body 12 and the first ends 54, 55 of the first and second intermediate tubes 20 and 22 are in the internal cavity 81 of the ferrule, all three bearing axially against the bottom 90 of the socket 82. The third spring 84 is in a state of maximum compression. Each pin 64 is positioned at the junction of the longitudinal arm 94 and transverse arm 96 of the corresponding groove 92; and at the first end 104 of the corresponding transverse slot 47.

In addition, each ball 100 is positioned in the corresponding first cup 49 of the skirt 40, forming an internal projection relative to the ferrule 60. The balls 100 thus prevent unintended rotation of the ferrule 60 around the enlarged portion 38.

Figure 5:
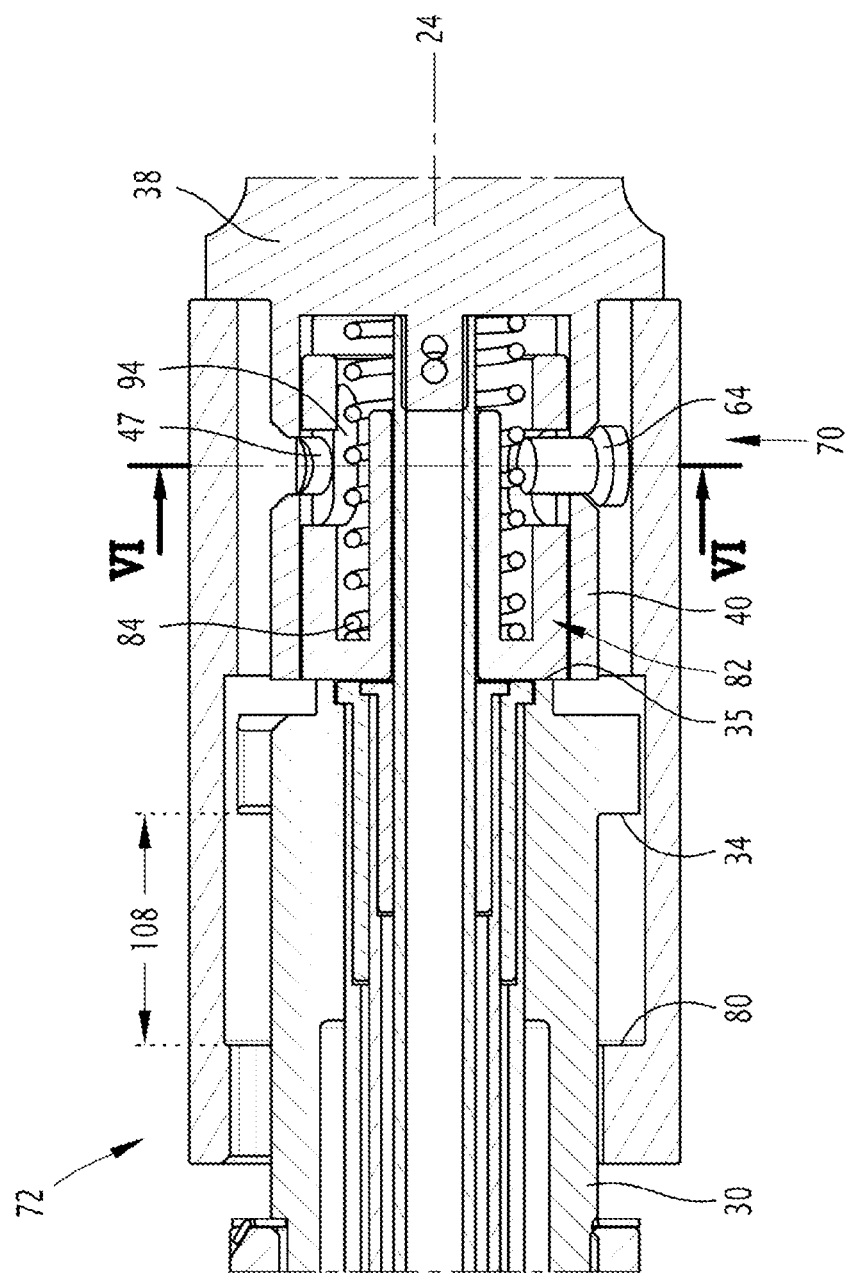
FIG. 5 is a partial view, in longitudinal section, of the assembly in a third configuration.
Figure 6:
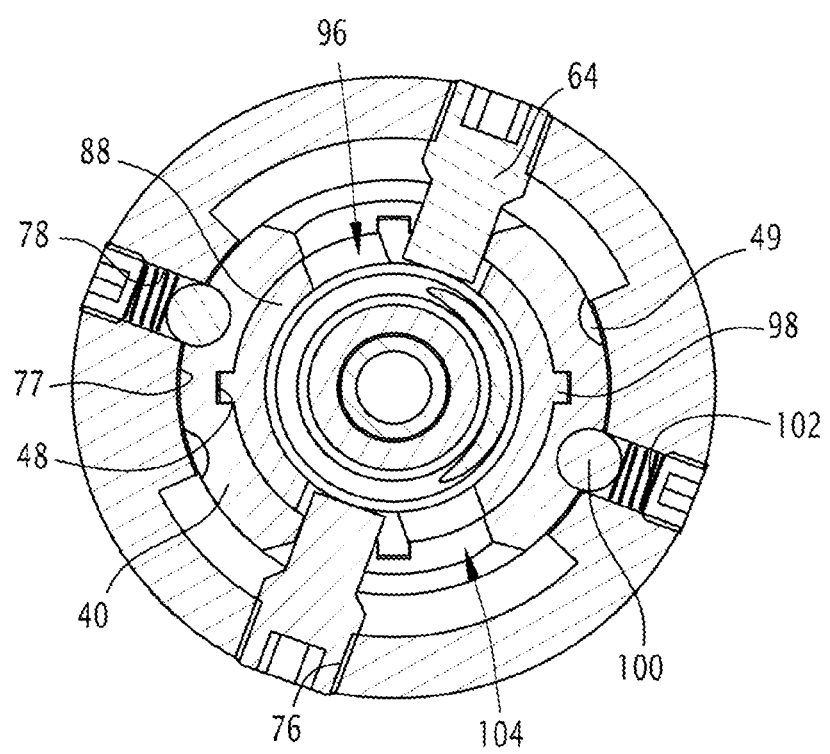
FIG. 6 is a cross-sectional view of the assembly in the third configuration of FIG. 5.

The configuration shown in FIGS. 5 and 6 will now be described. In FIGS. 5 and 6, the assembly 10 is in the retracted configuration and the ferrule 60 is in the locked position relative to the second tubular body 14.

More specifically, the first end 26 of the first tubular body 12 and the first ends 54, 55 of the first and second intermediate tubes 20 and 22 are in the internal cavity 81 of the ferrule, bearing axially against the bottom 90 of the socket 82. The third spring 84 is in a state of maximum compression. Each pin 64 is positioned at the closed end of the transverse arm 96 of the corresponding groove 92; and at a second end 106 of the corresponding transverse slot 47. Each ball 100 is positioned in the corresponding second cup 50.

Furthermore, in the locked position of the ferrule, the internal stop 80 of said ferrule is axially opposite the rear face 34 of the teeth 32 of the first end 26 of the first tubular body. The teeth 32 thus form a counter-stop which axially locks said first end 26 in the internal cavity 81 of the ferrule.

The invention further relates to an aircraft-type unit (not shown), comprising: a structure; a cowl hinged to said structure; and a telescopic assembly 10 described above. The first and second means of assembly 36 and 42 of the assembly 10 are, for example, fastened to the cowl and the structure respectively. In the extended configuration, the assembly 10 allows the cowl to be positioned in an open position. In the retracted configuration, the assembly 10 enables the cowl to be positioned and retained in the closed position.

A method of operating the assembly 10 will now be described.

From the extended configuration of the assembly 10, the telescopic system formed by the first tubular body 12, the first and second intermediate tubes 20 and 22 and the second tubular body 14 retracts axially, for example when the cowls A and B described above are closed. The assembly 10 takes on the intermediate configuration shown in FIG. 2. The first end 26 of the tubular body 12 is inserted axially into the recess 79 and arrives in the internal cavity 81, in contact with the bottom 90 of the socket 82.

The axial pressure exerted by the end face 35 on the socket 82 leads to the compression of the third spring 84. The pins 64 are then automatically located in the junction with the transverse arm 96 of the groove in the socket. When said junction is reached by pin 64, third spring 84 is in the maximum compression state described above (FIG. 3).

The actuator 68 is then activated to rotate the ferrule 60 around the rod 16 through an angular portion around the main axis 24. The socket 82 remains fixed by the engagement of the ribs 98 and the grooves 48. Said rotation leads to an angular displacement of each pin 64 towards the closed end of the transverse arm 96 of the groove 92 of the socket 82; and from the first 104 to the second 106 end of the transverse slot 47 of the skirt 40.

Moreover, during said rotation, the recess 79 of the ferrule shifts angularly, placing the internal stop 80 opposite the teeth 32 of the first tubular body. The ferrule 60 is thus in the locked position, with the internal stop 80 blocking the first end 26 of the first tubular body inside the internal cavity 81 of said ferrule.

In the embodiment shown, an axial dimension of the internal cavity 81 allows an axial clearance 108 (FIG. 5) of the first end 26 of the first tubular body inside said internal cavity, in the retracted configuration.

In addition, the rotation of the ferrule 60 from the unlocked position angularly displaces each first cup 49. The corresponding ball 100 is pushed back into the internal housing 78 of the ferrule, compressing the corresponding fourth spring 102.

When the ferrule reaches the locked position, each second cup 50 is angularly opposite an internal housing 78. The corresponding ball 100, pushed back by the fourth spring 102, is housed in said second cup 50. The ferrule is locked again to prevent unintentional rotation relative to the rod 16.

In order to move the ferrule from the locked position to the unlocked position, in a process reversed from that described above, the actuator is activated to rotate said ferrule in the opposite direction. The recess 79 again aligns with teeth 32, allowing axial displacement of the first end 26 of the first tubular body out of ferrule 60.

The pin 64 is again located at the junction of the transverse arm 96 and longitudinal arm 94 of groove 92. Under the action of the third spring 84, which releases, the socket moves axially towards the recess 79 of the ferrule, and the pin then rests against the closed end of the said longitudinal arm. The ferrule 60 is thus secured in the unlocked position relative to the first tubular body 12 and the second tubular body 14. The cowls A and B can then be opened, rotating each one around hinges A2 and B2, respectively. The distance between fastening points A1 and B1 increases, and the telescopic assembly 10 reaches the extended configuration.

The invention claimed is:

1. A telescopic assembly comprising: a first tubular body extending along a main axis; and a second tubular body comprising an enlarged portion and a rod, said rod being capable of sliding into a first axial end of the first tubular body for movement between an extended configuration and a retracted configuration;

the telescopic assembly further comprises a device for locking the retracted configuration, said locking device comprising a ferrule extending along the main axis, a first axial end of said ferrule being positioned around a first end of the rod of the second tubular body, close to the enlarged portion;

a second axial end of the ferrule comprising an internal stop; the first axial end of the first tubular body comprising a counter-stop, capable of cooperating with said internal stop to lock the first tubular body and the ferrule in translation;

the ferrule being locked in axial translation relative to the second tubular body and rotatable around said second body, between an unlocked position and a locked position, the telescopic assembly being such that:
in the unlocked position, the internal stop is angularly offset relative to the counter-stop, so as to allow the sliding of the second tubular body into the first tubular body between the extended configuration and the retracted configuration; and
in the locked position, the internal stop is angularly aligned with the counter-stop, so as to lock the second tubular body in the first tubular body in the retracted configuration.

2. The telescopic assembly according to claim 1, further comprising a securing device capable of allowing or preventing the rotation of the ferrule, wherein the securing device comprises: a socket positioned around the first end of the rod; and a compression spring, the compression spring being positioned axially between the enlarged portion of the second tubular body and the socket.

3. The telescopic assembly according to claim 2, further comprising a pin integral with the first axial end of the ferrule and projecting internally relative to said ferrule, and wherein the locking device comprises an L-shaped groove, said L-shaped groove comprising a longitudinal arm and a transverse arm, respectively parallel and perpendicular to the main axis, such that:
in the unlocked position, the first end of the first body is at a distance from the socket, the spring is in a state of minimum compression, and the pin is positioned in the longitudinal arm of the L-shaped groove of the locking device; and
in the locked position, the first end of the first body is in contact with the socket, the spring is in a state of maximum compression, and the pin is positioned in the transverse arm of the L-shaped groove.

4. The telescopic assembly according to claim 3, wherein the second tubular body comprises a skirt extending around the first end of the rod, said skirt comprising a transverse slot into which the pin is able to slide.

5. The telescopic assembly according to claim 2, the securing device further comprising a device for retaining the ferrule in a locked or unlocked position.

6. The telescopic assembly according to claim 5, in which the retaining device comprises: a ball capable of sliding radially into an internal housing of the ferrule; and a cup capable of receiving the ball projecting internally relative to the ferrule.

7. The telescopic assembly according to claim 1, further comprising at least one intermediate tube between the rod and the first tubular body, the at least one intermediate tube being capable of sliding around the rod and into the first axial end of the first tubular body.

8. The telescopic assembly according to claim 1, further comprising an actuator capable of pivoting the ferrule around the main axis, between the locked and unlocked positions.

9. Device comprising: first cowl and a second cowl; and a telescopic assembly according to claim 1, the first tubular body and the second tubular body being assembled respectively to the first cowl and to the second cowl, the extended configuration of the telescopic assembly allowing the first and second cowls to be fixed in an open position, the retracted configuration of the telescopic assembly allowing the first and second cowls to be fixed and retained in a closed position.

\* \* \* \* \*